United States Patent Office 2,733,217
Patented Jan. 31, 1956

2,733,217

SMOKE PRODUCING AMMUNITION

Mark M. Woyski and Carlyle E. Shoemaker, Urbana, Ill., assignors to the United States of America as represented by the Secretary of War No Drawing. Application September 23, 1947, Serial No. 775,738

2 Claims. (Cl. 252—305)

This invention relates to smoke producing ammunition and is particularly directed to a process and product for producing a smoke screen.

Smoke screens are released by various means, including valve operated generators, and by ammunition in which a smoke producing compound or agent is released, ignited, and dispersed by a burster charge. The burster type compound may be used in rotating and nonrotating ammunition. Nonrotating ammunition includes bombs, grenades, stabilized rocket projectiles and some types of mortar projectiles as well as various smoke pots or candles actuated by a bursting charge. Rotating ammunition includes all projectiles fired in a rifled gun barrel, such as artillery shells.

Phosphorus has long been used as a smoke agent, but it has certain disadvantages among which are its rapid combustion and generation of heat which results in the pillaring of the smoke. It also has a tendency toward excess fragmentation which seriously reduces the obscuring power of the resulting smoke screen.

The primary object of the present invention is to provide a compound or composition of matter for use as a smoke agent in ammunition of the burster type that will prevent the pillaring of the smoke screen resulting from the use of phosphorus. Another object is to inhibit undesirable fragmentation in phosphorus when used in a smoke producing compound. A further object is to provide such a smoke agent that will be ballistically and chemically stable when used in projectiles of the type described. An additional object is to provide a process for producing smoke producing compounds of the type described herein. Other equally important objects will more plainly appear from the detailed specification and claims presented in exemplification, but not in limitation of the present invention.

A preferred embodiment of the present invention is described as a smoke producing agent or compound comprising a mixture of finely divided phosphorus and a viscous solution or so-called gel of an elastomer, such as synthetic gum rubber. The phosphorus is preferably reduced to an average particle diameter of about 0.45 mm. by a process of granulation in which a violently agitated mixture of molten phosphorus and hot water is cooled below the freezing point of phosphorus by the addition of cold water. For example, the elastomer solution or gel may be prepared as follows: an elastomer is reduced to pieces 1/8" to 1/4" in diameter by milling. The milled elastomer is mixed with a solvent and the mixture set aside for six to twenty-four hours, or until it becomes homogeneous by diffusion. The elastomer solution is then mixed with the granulated phosphorus under water in a suitable mixer, such as a Cincinnatus type mixer, for 20–40 minutes.

An elastomer is defined herein as an organic polymer possessing elasticity at normal temperatures. The term comprehends, among other compounds, natural and synthetic types of rubber, including copolymers of butadiene and styrene; neoprene; and poly sulfide types of rubber, such as the type known as Thiokol.

The preferred elastomer used in the preparation of the novel smoke agent described herein is a rubber designated as a copolymer of butadiene and styrene to which approximately 1.5% by weight of a standard anti-oxidant has been added during manufacture. Of the hydrocarbon present in this rubber, approximately 23.5% by weight is derived from styrene and approximately 76.5% by weight from butadiene. An outline of the ingredients of this rubber includes:

| | Percent |
|---|---|
| Volatile matter | .75 |
| Acetone, extract | 10.00 |
| Fatty acid | 3.75 |
| Soap | .75 |
| Ash | Inconsiderable |
| Gel content including the benzine insoluble fraction of the rubber | Usually nil |

Two types of smoke producing compounds are required. These differ primarily in their apparent viscosity or consistency. An improved type designated herein as 75–35 contains, on a dry basis, 75% phosphorus and 25% of the aforementioned rubber solution, in which the rubber solution contains 35% rubber and 65% solvent, such as xylene. This formula provides vastly improved results in nonrotating munitions having non-critical ballistics. Rotating projectiles having critical ballistics require a smoke agent with a high viscosity. Such a material, designated herein as Type 75–40–30LO, comprises 75% white phosphorus and 25% rubber gel; the rubber gel is preferably a solution comprising 40% of the synthetic rubber previously described herein and designated as the preferred elastomer, 30% of a solvent such as xylene, and 30% of a plasticizer such as boiled linseed oil. In order to control the plasticity of the smoke agent, the concentrated solution viscosity of the elastomer is held within the limits 100 to 200 poises as determined by the falling ball method on a 16.5% solution of the preferred elastomer in xylene.

The synthetic rubber designated herein as the preferred elastomer may be obtained from the manufacture in irregular pieces formed during the coagulation of the latex. These pieces are then further reduced in size by milling, as the particle size of the rubber determines the rate of solution, and therefore the time required to obtain the homogeneous solution or so-called rubber gel. Unless the reduction of particle size is performed in several stages the heat developed is excessive and the particles have a tendency to cohere, accordingly means are provided to cool the material and keep it free flowing. Best results are obtained with rubber finally reduced by milling to an average diameter of approximately 3/16" to 1/4".

The milled rubber is poured into the required amount of solvent. This procedure is preferable to the reverse because it permits better separation of the rubber particles and better wetting. Care should be taken to guard against cohesion of the rubber particles, which greatly retards solution. The mixing container is closed tightly and tumbled end over end mechanically until sufficient solution has taken place to make the liquid phase thick and the mixture difficult to pour. Once this stage is reached, separation of phases during the storage period will not take place. The time required for this step may vary from approximately 2 to 15 minutes, depending on the particle size of the rubber and the type of solvent. Sufficient mixing time is important because if the liquid phase is too thin the rubber has a tendency either to float or to sink, and after storage the concentration of the solution will be greater at either the top or bottom, or in extreme cases a large quantity of very thick liquid may remain.

The plasticizer, such as linseed oil, is mixed with the solvent, such as xylene, before the rubber is added. The oil diffuses into the rubber at a much slower rate than the xylene and therefore tends to separate. Separation may be avoided by prolonging the mixing time to 20 minutes or more, depending on the plasticizer used.

The foregoing description presents the present invention in detail with respect to a preferred embodiment thereof and does not contemplate limitation thereto but is intended to include all forms and modifications thereof within the spirit and scope of the appended claims.

After it has been allowed to stand and become thick, the rubber solution or so-called gel tends to adhere strongly to the sides of the storage containers and is very difficult to remove. This is prevented after the preliminary mixing by pouring the rubber solution into an aging container, the inside of which has been freshly coated with a film of starch paste to prevent contact of the rubber solution with the container walls. When the rubber solution is ready to be used, it readily drops out of the storage container in one piece.

Commercial phosphorus, preferably white phosphorus, is preferred for the manufacture of the improved smoke producing compound described herein. Particle size and distribution are the important characteristics of the phosphorus which must be controlled. Specifications preferred for granulated phosphorus require 75% of the phosphorus to be in the particle size range 0.2 to 0.6 mm. diameter.

A preferred procedure is as follows: the granulated phosphorus is introduced into the water in the mixer. A preferred mixer is a jacketed double sigma blade Cincinnatus type, with blades operating at the same speed in opposite directions, and having an inlet pipe for introducing $CO_2$ gas. A drain is provided near the top of the mixer with a large removable screen to allow drainage of water without undue loss of phosphorus. A water spray, directed to submerge floating phosphorus particles, is also important.

The rubber solution is dumped in and while the mixer is flushed with carbon dioxide, it is tilted to drain off most of the water. Mixing does not begin properly if too much water is left in the mixer. After 5 to 10 minutes mixing, the rubber solution has picked up all of the granulated phosphorus and the water may be run back into the mixer to aid in dissipation of heat. Mixing is then continued for an additional 15 to 20 minutes.

During the research that led to the development of the present invention, it was found that the plasticity of the compound was increased by the addition of neoprene and zinc oxide and subsequently curing the compound by aging at 35° C. It was found that vegetable oils when added as plasticizers also gave the greatest viscosity to the compound. Refined soybean oil had the best effect, cottonseed oil and linseed oil were about equal and crude soybean oil less effective than refined soybean oil. Solvents for the rubber were used instead of xylene but were found not as effective. Among the solvents used were turpentine, fuel oil, and lube oil SAE–20. It was also found that agitation of the concentrated rubber solution improved its viscosity.

*Example 1*

In general it is preferred that the improved smoke producing compound herein described be formed of a mixture containing approximately 70 to 75% of white phosphorus and 30 to 25% of an elastomer solution or so-called rubber gel. This gel preferably contains approximately 30 to 40% of an elastomer, such as natural or synthetic rubber, and 5 to 35% of a solvent for the elastomer, such as xylene, and 35 to 5% of a plasticizer or viscosity increasing agent, such as linseed oil, or refined soybean oil.

*Example 2*

When used in combination with a bursting charge in projectiles of the rotating and nonrotating type, the herein described improved smoke producing compound comprises 72 to 75 parts by weight of white phosphorus exclusive of the weight of any water held therein, and 25 to 28 parts by weight of a gelatinous solution of an elastomer or so-called rubber gel.

For use in the nonrotating type of projectile the phosphorus is mixed with a gel that has the following formula:

| | Parts by weight |
|---|---|
| Elastomer | 35 plus or minus 1 |
| Solvent (xylene plus boiled linseed oil) | 65 plus or minus 1 |

The preferred elastomer in the above formula is a synthetic rubber designated as a copolymer of butadiene and styrene in which approximately 23.5% by weight of the hydrocarbon present therein is derived from styrene, and approximately 76.5% by weight from butadiene. Approximately 1.5 by weight of a standard anti-oxidant is also present therein. The viscosity of this compound is held within the limits of 25 to 60 on the extrusion plastometer. To attain this viscosity the total of 65 parts by weight of solvent and oil in the above formula is divided as follows: approximately 20 parts by weight of oil, such as boiled linseed oil and approximately 45 parts by weight of solvent, such as xylene.

*Example 3*

For use in the rotating type of projectile the phosphorus is mixed with a gel that has the following preferred formula:

| | Parts by weight |
|---|---|
| Elastomer | 40 plus or minus 1 |
| Solvent (xylene) | 30 plus or minus 1 |
| Plasticizer (boiled linseed oil) | 30 plus or minus 1 |

This viscosity of this compound must be held within the limits of 60 to 90 on the extrusion plastometer and must not be less than 60. The elastomer preferred in this formula is the same as described under Example 2.

The viscosity, or plasticity, of the improved smoke producing compounds described herein is preferably determined by an extrusion plastometer. The results are expressed in terms of a viscosity number that indicates the pressure which must be applied to the compound to produce a rate of extrusion described as equivalent to a rate of shear of 100 reciprocal seconds. This plastometer method, the falling ball method, and the Mooney method for determining viscosity have had extensive use at the Army Chemical Center, Maryland.

The structure of the smoke producing compound described herein is a matrix of rubber films confining the particles of phosphorus within the cells of the matrix. Thermal stability of the compound is dependent upon the continuity of these films. When mixtures of good thermal stability are examined by microscope, each granule of phosphorus is seen to be separated from adjoining granules by the films of rubber. In unstable mixtures numerous particles of phosphorus are seen to be in contact with each other in cavities in the rubber matrix. Thermal stability therefore has been shown to depend upon the building up of the proper structure by thorough kneading action in the mixer. The aforementioned rubber matrix resulted from the use of 80–20 butadiene-styrene polymers made by the emulsion process in Government-operated plants for the manufacture of synthetic rubber. Such types of rubber have a Mooney viscosity between 40–60, they contain approximately 5% fatty acids, 2% anti-oxidant, .5% soap, less than 2% water and less than 3% inherent gel content.

Thermal stability, in addition to the other factors described herein, provides the smoke producing compound of the present invention with the long desired qualities needed to control fragmentation, to prevent pillaring of the smoke screen, and finally to prevent disintegration due to the low melting point of phosphorus during dispersion of the compound by a bursting charge.

In the present invention, ballistic stability is provided by the controlled viscosity afforded by the compound set forth by Example 3 herein for rotating projectiles, and by Example 2 herein for nonrotating projectiles. The elastomers described therein provide a dough-like gelatinous compound of the viscosity required to prevent compacting or shifting of the center of gravity of the compound during the flight of the projectile to its target.

The present invention was generated by continuation of research that previously resulted in copending application, Serial No. 572,948, filed January 15, 1945, jointly by Mark M. Woyski and Elmer A. Ford, co-inventors at the University of Illinois while under contract with the Office of Scientific Research and Development, Office for Emergency Management, Executive Office of the President, United States of America.

We claim:

1. The method of making a smoke producing composition that includes the following steps; granulating white phosphorus to provide approximately 75% of the resulting granules with a particle size range from approximately .2 to .6 mm. in diameter; milling synthetic rubber to a particle size of approximately 3/16" to 1/4" in diameter; mixing a plasticizer for said rubber with a solvent for said rubber to provide a solvent mixture; introducing said milled rubber into said solvent mixture; mixing said rubber with said solvent mixture to provide a solution of said rubber in the form of a gel; allowing said gel to stand and thicken, introducing said gel into said granulated phosphorus in the presence of water and carbon dioxide; removing excess water therefrom; mixing until said gel has picked up all of said phosphorus; and subsequently thoroughly kneading said phosphorus into said solution of rubber in the presence of additional water to reduce the temperature during said kneading.

2. The method of making a smoke producing composition that includes the following steps: mixing a solution of an elastomer in the form of a gel with granulated phosphorus in the presence of water and carbon dioxide and subsequently thoroughly kneading said phosphorus into said elastomer solution until the phosphorus particles are separated from each other in a cellular matrix formed of said rubber.

References Cited in the file of this patent

UNITED STATES PATENTS

| 1,329,443 | Thomas | Feb. 3, 1920 |
| 1,863,517 | White | June 14, 1932 |
| 2,574,466 | Clay et al. | Nov. 13, 1951 |

FOREIGN PATENTS

| 7,314 | Great Britain | of 1915 |
| 269,979 | Great Britain | Apr. 27, 1927 |
| 579,740 | Great Britain | Aug. 14, 1946 |

OTHER REFERENCES

Journal of The Society of Arts, volume 2 (1853–54), pages 827–9.